United States Patent
Balser et al.

(10) Patent No.: US 10,462,000 B2
(45) Date of Patent: Oct. 29, 2019

(54) MICRO-SERVICES FOR CONFIGURING SWITCHES

(71) Applicant: HEWLETT PACKARD ENTERPRISE DEVELOPMENT LP, Houston, TX (US)

(72) Inventors: Robert W Balser, Fort Collins, CO (US); Vanessa Lorraine Black, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 15/241,824

(22) Filed: Aug. 19, 2016

(65) Prior Publication Data
US 2018/0054355 A1 Feb. 22, 2018

(51) Int. Cl.
*H04L 12/24* (2006.01)

(52) U.S. Cl.
CPC ...... *H04L 41/0806* (2013.01); *H04L 41/0843* (2013.01)

(58) Field of Classification Search
CPC ............ H04L 41/0806; H04L 41/0843; H04L 41/5048; H04L 49/70; H04L 67/16
See application file for complete search history.

(56) References Cited

U.S. PATENT DOCUMENTS

| | | |
|---|---|---|
| 2014/0075558 A1 | 3/2014 | Ward et al. |
| 2016/0105381 A1 | 4/2016 | Baphna et al. |
| 2016/0124742 A1 | 5/2016 | Rangasamy et al. |
| 2016/0330076 A1* | 11/2016 | Tiwari ............... H04L 41/0806 |
| 2018/0109634 A1* | 4/2018 | Lawson ............... H04L 67/141 |

OTHER PUBLICATIONS

Antonakakis, M. et al., "From Throw-Away Traffic to Bots: Detecting the Rise of DGA-Based Malware," Presented as part of the 21st USENIX Security Symposium (USENIX Security 12), 2012, 16 pages.

* cited by examiner

*Primary Examiner* — Habte Mered
(74) *Attorney, Agent, or Firm* — Hewlett Packard Enterprise Patent Department (57) ABSTRACT

In some examples a plurality of stored micro-services may be exposed. Each micro-service may include at least one generic configuration primitive to configure a plurality of switches. A call including configuration parameters may be received. The call is to a particular micro-service from the plurality of micro-services stored in the virtual device and to a particular switch from the plurality of switches. A switch driver corresponding to the particular switch may be detected. Each switch driver may include configuration commands to implement the respective at least one configuration primitive of the respective micro-service. The respective at least one configuration primitive may be called on the respective switch driver based on the respective configuration parameters.

20 Claims, 5 Drawing Sheets

MICRO-SERVICES FOR CONFIGURING SWITCHES

BACKGROUND

Development of infrastructures for data communication networks has enabled applications to achieve high processing performance. Such networks are highly scalable and, hence, many kinds of information and provider services may be made available through networks. In order to create and maintain a data communication network, computer network devices, such as switches, may be initially and periodically configured.

BRIEF DESCRIPTION OF THE DRAWINGS

The following detailed description references the drawings, wherein.

DETAILED DESCRIPTION

Switches are computer network devices that connect devices on a computer network by using packet switching to receive, process and forward data to a destination device. In order to create and maintain a computer network, computer network devices forming the computer network, such as switches, network routers, etc., must be configured. The configuration of the switches may be performed at the initialization of the computer network and dynamically during functioning of the computer network. Although switches may share a common set of network configuration functionalities, e.g., switches may each implement interfaces and VLANs, each network device manufacturer may provide different ways to configure these common network device abstractions. Therefore, there may be configuration command differences between a single manufacturer's switch models or even firmware releases that may involve performing different and independent configuration processes for each one of the switches forming the computer network.

As the number of types or models of network devices, such as the switches, are increased in a data center, the more complex and error-prone the configuration process of these network devices becomes. With dozens of switches types or models and many kinds of configurations that can be made, their configuration process may become more difficult and resource consuming.

To deal with these differences between the existing switch types, models and implementations, network engineers may generate specific configuration management scripts supporting each user-requested configuration change and re-implement them for each and every existing switch type and model in the computer network. Changes or enhancements to supported configurations may be replicated across each and every configuration management script. For example, if there are 10 different configurations and 20 different switches (from 20 different manufacturers) to be supported, then, there would be 200 scripts to manage the switch configurations. If a change is to be performed in one of the supported configurations, 20 scripts, containing low-level manufacturer-specific definition, may be changed. This is a high time and resource consuming process.

To address these issues, examples described herein describe a computing device storing a virtual device that may separate what is to be configured in network devices, such as the switches, from how it is configured by presenting a generic configuration interface to users or clients and then delegating specific configuration work (e.g., connecting the virtual device to the switch, getting the switch into its configuration mode, and executing configuration commands) to the specific network device drivers, such as switch drivers, that contain the specific configuration commands. Such examples provide networking device virtualization, an abstraction layer for client applications that uses an interface with real network devices in a heterogeneous environment.

The virtual device is a generic abstraction of the configuration interface to a switch such that any switch may be configured using this generic interface instead of the switch's actual specific interface.

The virtual device may expose a plurality of stored micro-services to configure specific switches, such as switches, routers, etc., through respective switch drivers. These micro-services store configuration primitives to configure specific configuration characteristics of the switches. The configuration primitive is the configuration element (e.g. the smallest granular configuration element) to modify a specific configuration characteristic or feature of a particular switch. Examples of configurations implemented by configuration primitives include: bringing a port online; creating a port channel; assigning a port to a port channel; creating a VLAN, etc. These configuration primitives are generic so, each configuration primitive may be implemented by a plurality of different switch drivers to modify a single configuration characteristic of a plurality of switches. In some other examples, the micro-services may comprise a plurality of configuration primitives that may be implemented by a plurality of different switch drivers to modify a plurality of configuration areas of a plurality of switches. A configuration area may be an area of configuration of a switch, such as anything to do with port channel configuration, anything to do with port configuration, etc. Examples of configuration areas are: VLANs; ports; port channels, etc.

The virtual device acts as a generic device that may receive micro-service calls from users. Examples of clients or users may be: users using configuration management software designed to configure switches to match a default configuration; network engineers using configuration management software to configure switches to match a selected configuration. The micro-service calls may include a micro-service identifier to identify at least one micro-service among the set of micro-services stored in the virtual device, at least one switch identifier to identify the switches among the set of switches of the computer network and at least one specific switch configuration parameter, such that, one single micro-service call may modify a configuration area or multiple configuration areas of multiple switches by calling multiple micro-services from the virtual device at the same time.

These specific switch configuration parameters may be, for example, simple strings including numbers, names, Boolean parameters, etc. In response to receiving a micro-service call, the virtual device may detect the switch drivers that correspond to the switches identified in the call and on which the change in the configuration is to be performed. Each one of the switch drivers may be programmed with the specific configuration commands that are appropriate to the switch to which the switch driver is related. These configuration commands may allow the switch driver to implement the configuration primitives received from the micro-services for that specific switch. For example, a generic micro-service that is called "PortChannelCreationService" stores the configuration primitive "createPortChannel( )" that is delegated by the micro-service to a matching function "createPortChannel( )" stored on the corresponding switch driver. The name of the function may be generic, shared by all the switch drivers, but the function implementation, its contents and the commands it may execute, may be specific to the switch driver. The micro-service may also pass the received configuration parameters to the corresponding switch driver. Function "createPortChannel( )" contains the device-specific commands to execute the change in the configuration of the switch advertised by the micro-service to create a new port channel in the specific switch.

In this way, a user is able to call the same micro-service to act on different switch types or models and get correct configuration results for each of these switches.

In some other examples, micro-services may be grouped forming meta-configurations, also called macro-services, covering an area of configuration of the switches. The meta-configurations may be stored in a catalog of meta-configurations in the virtual device. Different micro-services covering an area of configuration of the switches may be grouped by a configuration engine. For example, micro-services such as "PortChannelCreateService" to create port channels in the switch and "InterfaceSpeed Service" to configure the speed of the port channel of the switch may be grouped by the configuration engine in a meta-configuration named as "PORTCHANNELCONFIG" that stores those micro-services and others related to the configuration of the port channels of the switches. The meta-configurations may be also combined by the configuration engine forming more complex or custom configurations covering different areas of configuration of the switches.

Figure 1:
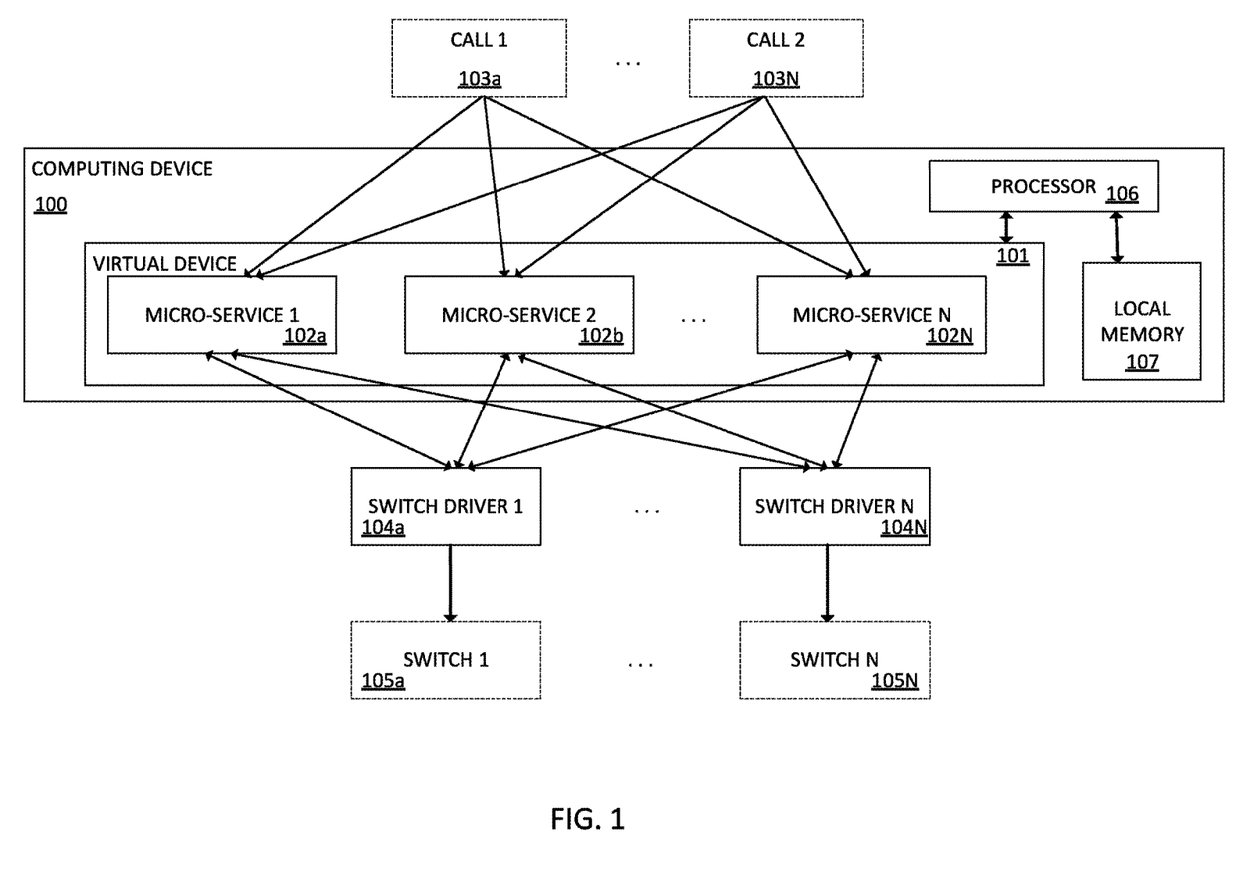
FIG. 1 is a block diagram of an example computing device for configuring switches using micro-services in a virtual device.

Referring now to the drawings, FIG. 1 is a block diagram of an example computing device 100 for configuring switches using micro-services stored in a virtual device 101. The computing device 100 comprises a processor 106 and a local memory 107 that stores instructions, that, when executed by the processor 106, implement the virtual device 101. The virtual device 101 includes a plurality of micro-services 102a-102N, in which N represents an integer value greater than one, for configuring a plurality of switches 105a-105N, in which N represents an integer value greater than one. As used herein, a "computing device" may be a desktop computer, laptop (or notebook) computer, workstation, tablet computer, mobile phone, smart device, server, blade enclosure, or any other processing device or equipment including a processing resource. In examples described herein, the processor 106 may include, for example, one processor or multiple processors included in a single computing device or distributed across multiple computing devices.

The virtual device 101 exposes, i.e., provide access to, a plurality of stored micro-services 102a-102N, in which N represents an integer value greater than one, wherein each micro-service 102a-102N stores a generic configuration primitive to configure a specific configuration characteristic of a plurality of switches 105a-105N, in which N represents an integer value greater than one, Examples of configuration characteristics may be the name of a VLAN, the existence of a port channel, the assignment of a port to a port-channel, etc.

The virtual device 101 receives calls 103a-103N, in which N represents an integer greater than one, that comprise some configuration parameters, a switch identifier to identify the single switch 105a-105N on which the configuration change is to be performed and a micro-service identifier to identify the single micro-service 102a-102N that is to be called, and thus, the configuration change that is to be performed in the identified switch 105a-105N.

In such examples, the virtual device 101 detects and identifies the switch driver 104a-104N, in which N represents an integer greater than one, of the switch 105a-105N to which the change in the configuration is to be performed. Then, the invoked micro-service 102a-102N calls its reference to the configuration primitive that it stores. Said configuration primitive with the configuration parameters received are passed to the corresponding switch driver 104a-104N that stores specific configuration commands to execute the configuration primitive advertised by the micro-service 102a-102N. The micro-services 102a-102N call on their configuration primitive references on the corresponding switch drivers 104a-104N, based on the received configuration parameters, to configure the respective switches 105a-105N. Thus, the called micro-services 102a-102N are processed by the corresponding switch drivers 104a-104N for each one of the different heterogeneous switches 105a-105N that have to be configured.

For example, "call_1" 103a may invoke "micro-service_2" 102b, which stores a reference to a configuration primitive to activate a port in the switches 105a-105N. Said "micro-service_2" 102b may call its reference to the configuration primitive on a switch driver, for example "switch driver_1" 104a that is associated to "switch_1" 105a, and said "switch driver_1" 104a may implement specific configuration commands to activate a port in the "switch_1" 105a. The port activated in the switch_1 105a may depend on the configuration commands received in the call. Thus, each switch driver 104a-104N may comprise a plurality of configuration commands to implement each the configuration primitives exposed by each of the micro-services 102a-102N stored in the virtual device 101.

In some other examples, the virtual device 101 may receive calls 103a-103N that comprise configuration parameters, a switch identifier to identify a single switch 105a-105N on which the configuration change is to be performed and micro-service identifiers to identify a plurality of micro-services to be executed on the identified switch 105a-105N. For example, "call_1" 103a may comprise a single switch identifier identifying "switch_1" 105a, two micro-service identifiers identifying "micro-service_1'" 102a, for example a micro-service to place a switch interface into trunking mode, and "micro-service_2" 102b, for example a micro-service to enable a port of the switch, and configuration parameters, such as the number of the port that is requested to be enabled, for example port 1, and the name of the interface to be placed into trunking mode for example "port-channel 123" Therefore, "call_1" 103a will enable port 1 and place the port-channel 123 into trunking mode on switch_1 105a.

In some other examples, the virtual device 101 may receive calls 103a-103N that comprise configuration parameters, a plurality of switch identifiers to identify a plurality of switches 105a-105N on which the configuration change is to be performed and a plurality of micro-service identifiers to identify a plurality of micro-services 102a-102N that are to be executed, and thus the configuration changes that are to be performed in the plurality of identified switches 105a-105N. For example, "call_1" 103a may comprise switch identifiers identifying "switch_1" 105a and "switch_N" 105N, micro-service identifiers identifying "micro-service_1" 102a and "micro-service_2" 102b, for example micro-service to respectively place a switch interface into trunking mode and enable a port of the switch, and configuration parameters, such as the number of the port that is requested to be enabled, for example port 1 and the name of the interface to place into trunking mode, for example port-channel 123. Therefore, "call_ 1" 103a will enable port 1 and place port-channel 123 into trunking mode on switches 1 105a and N 105N.

In some other examples, each micro-service 102a-102N may store a plurality of references to generic configuration primitives to configure a plurality of specific configuration characteristics of a plurality of switches 105a-105N. For example, "micro-service_1" 102a may comprise a first generic configuration primitive to create a port channel on a switch, called "PortChannelCreationService( )", and a second configuration primitive to place the port channel into trunking mode, called "InterfaceTrunkingService( )". The order in which the stored configuration primitive references are called on the corresponding switch driver may be stored in the micro-service itself.

As used herein, computing device 100 may include network interface device(s) to communicate with other computing resource(s) (e.g., computing device(s)) and with the switches 105a-105N via their respective switch drivers 104a-104N. As described herein, a computer network may include, for example, a local area network (LAN), a virtual LAN (VLAN), a wireless local area network (WLAN), a virtual private network (VPN), the Internet, or the like, or a combination thereof.

In some examples, when a micro-service 102a-102N calls its reference to the configuration primitive that it stores, the virtual device 101 creates a connection between the virtual device 101 itself and the corresponding switch driver 104a-104N, the virtual device causes the respective switch 105a-105N to activate a configuration mode and to execute the configuration commands to implement the configuration primitive of the micro-service 102a-102N.

In some examples, the micro-services 102a-102N may be used to create and maintain a connection to the switches 105a-105N over which the specific configuration commands and parameters are sent. This connection is independent from the switch driver 104a-104N implemented in the switches 105a-105N. Thus, users do not have to concern themselves with connecting to the switches or with knowing the specific commands needed to configure the switches. For example, the micro-services 102a-102N may connect to the switches 105a-105N via a Secure Shell (SSH) protocol and so, this connection is created and maintained regardless of the switch driver 104a-104N used. Moreover, the micro-services 102a-102N may detect the kind of protocol used by the switches 105a-105N and create the appropriate connection to said switches 105a-105N. Some other examples of protocols to connect the micro-services 102a-102N to the switches 105a-105N may be telnet protocol, Hypertext Transfer Protocol (HTTP), etc.

Figure 2:
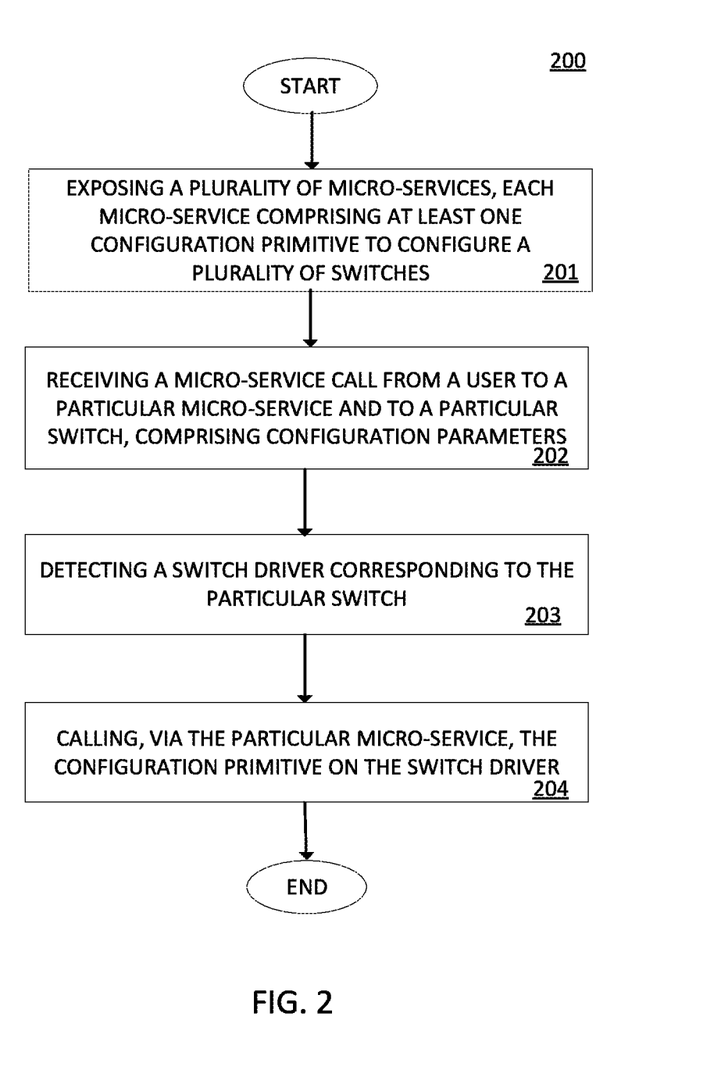
FIG. 2 is a flowchart of an example method for configuring switches using micro-services in a virtual device.

FIG. 2 is a flowchart of an example method 200 for configuring switches using micro-services stored in a virtual device. Although execution of method 200 is described below with reference to computing device 100 of FIG. 1, other suitable systems for the execution of method 200 may be utilized (e.g., computing device 300 of FIG. 3 or computing device 401 of FIG. 4). Additionally, implementation of method 200 is not limited to such examples.

At 201 of method 200, the virtual device exposes, i.e., provide access to, a plurality of micro-services 102a-102N to a user. Each micro-service 102a-102N comprises at least one configuration primitive to configure at least a particular configuration characteristic of the plurality of switches 105a-105N.

At 202 of method 200, the virtual device 101 receives a micro-service call 103a-103N from a user comprising configuration parameters. The micro-service call 103a-103N may be to a particular micro-service from the plurality of micro-services 102a-102N and to a particular switch from the plurality of switches 105a-105N. In an example, a user may request a configuration change on a switch, e.g., add a VLAN to a port on a specific switch, by calling the appropriate micro-service in the virtual device 101 to take care of executing that configuration change. The user may provide the configuration parameters, the switch identifier and the micro-service identifier.

At 203 of method 200, the virtual device 101 detects a switch driver corresponding to the particular switch. The virtual device 101 looks up the switch driver 104a-104N matching the switch device type being configured and then calls the appropriate configuration primitive on the switch driver 104a-104N and delegates the configuration parameters and the configuration primitive work to the switch driver 104a-104N. Each switch driver 104a-104N comprises configuration commands to implement the respective configuration primitive referred to by the respective micro-service 102a-102N.

At 204 of method 200, the invoked micro-service calls its reference to the respective configuration primitive on the respective switch driver 104a-104N and passes in the configuration parameters received with the call. The referenced configuration primitive implemented in the switch driver 203 associated to the requested switch, executes the precise set of configuration commands for successful configuration of the switch.

In some examples, the virtual device 101 may communicate with the switch drivers 104a-104N via an interface that the switch drivers 104a-104N expose. For instance, both the micro-services 102a-102N and the switch drivers 104a-104N may be written in an specific programming language in which case the micro-services 102a-102N may make a switch drivers 104a-104N API call in said specific programming language. In some other examples, the switch drivers 104a-104N may be written in some scripting language in which case the micro-services 102a-102N may make use of the respective scripting engine to call and pass parameters to the switch drivers 104a-104N scripts.

The virtual device 101 storing the micro-services 102a-102N allows the heterogeneous configuration of a plurality of switches 105a-105N of any model, type or manufacturer. For that, the virtual device 101 is a vendor-agnostic virtual device by making use of a micro-services framework that stores a plurality of generic configuration primitives that may be implemented in the switch drivers 104*a*-104N of the plurality of switches 105*a*-105N of a computer network.

Examples herein described, allow to create a network device abstraction, or "virtual device", so that "define once—run anywhere" configurations can be created and executed against heterogeneous switches. This is achieved by presenting to the users a catalog of micro-configuration services which are the configuration primitives defining what can be configured on the switches. The device-specific implementations of these primitives are then defined in a driver layer where vendor/model-specific concerns are handled.

In some examples, functionalities described herein in relation to FIG. 2 may be provided in combination with functionalities described herein in relation to any of FIGS. 1, 3, 4 and 5.

Figure 3:
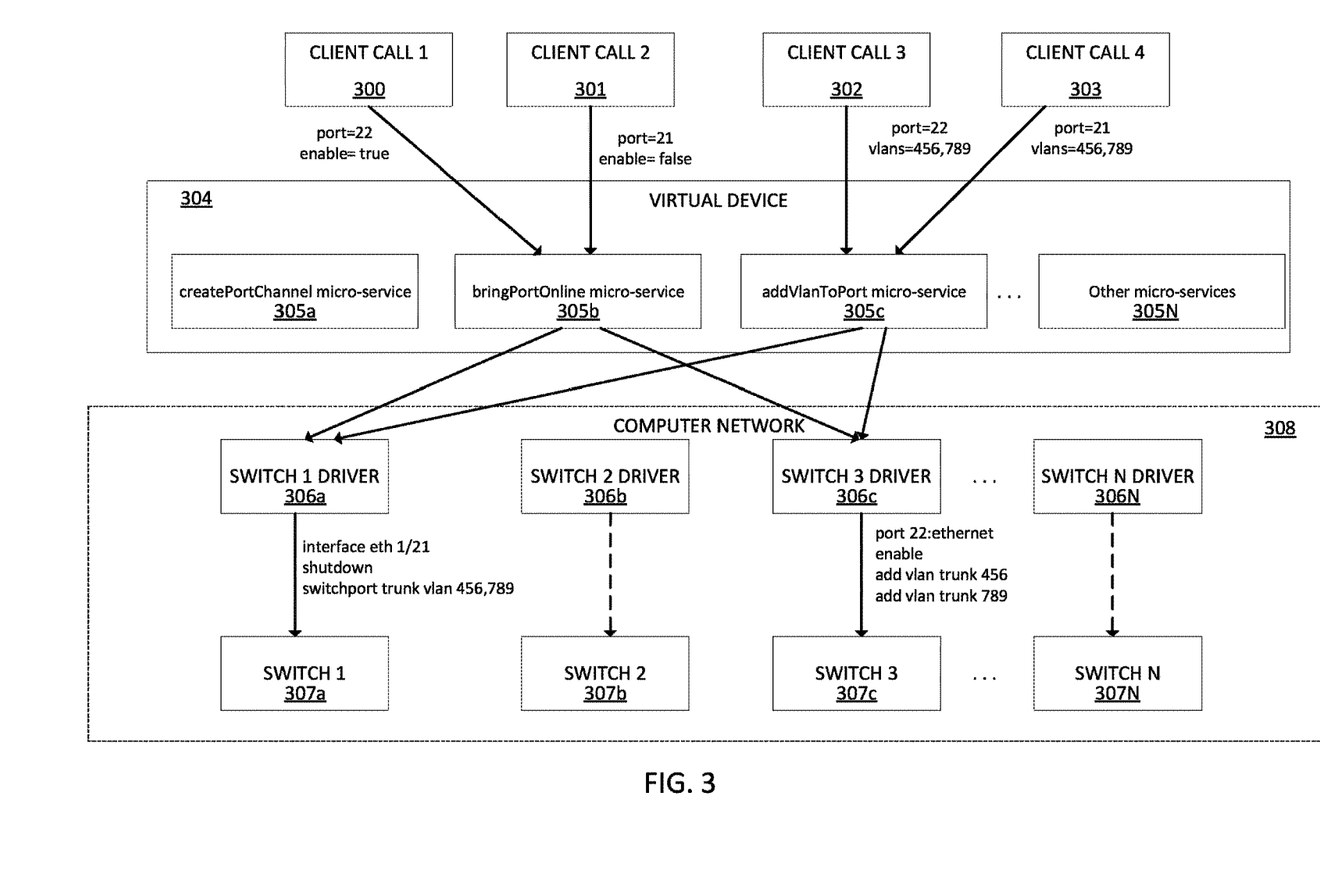
FIG. 3 is a block diagram of an example virtual device storing micro-services for configuring switches, including a plurality of micro-services and a plurality of switches.

FIG. 3 is a block diagram of an example virtual device 304 storing micro-services for configuring switches in a computer network, including a plurality of micro-services and a plurality of switches. The virtual device 304 exposes a first micro-service 305*a* named as "createPortChannel micro-service" storing a generic configuration primitive to create a port channel in the plurality of switches 307*a*-307N, in which N is an integer value greater than one, a second micro-service 305*b* named as "bringPortOnline micro-service" storing a generic configuration primitive to activate a port channel in the plurality of switches 307*a*-307N, a third micro-service 305*c* named as "addVlanToPort micro-service" storing a generic configuration primitive to add a VLAN to a port channel in the plurality of switches 307*a*-307N and other non-specified micro-services 305N, in which N is an integer value greater than one.

The virtual device 304 receives 4 client calls 300-303 to make respective changes in the configuration of the switches 307*a*-307N of the computer network 308. Each one of the switches 307*a*-307N is associated to a respective switch driver 306*a*-306N, in which N is an integer value greater than one. The invoked micro-services 305*b* and 305*c* call their references to the configuration primitives with the configuration parameters received in the respective client calls 300-303 on the corresponding switch drivers 306*a*-306N to configure the respective switches 307*a*-307N. Switch drivers 306*a*-306N store specific configuration commands to execute all the configuration primitives advertised by all the micro-services 305*a*-305N exposed by the virtual device 304.

More specifically, the virtual device 304 receives a first client call 300 in which the micro-service identifier relates to the second micro-service 305*b* storing a generic configuration primitive to activate a port, the switch identifier refers to switch_3 307*c* and the configuration parameters are the number of the port, 22, and a Boolean parameter, enable=true. Thus, the first client call 300 is to activate port 22 of switch_3 307*c*. The virtual device 304 further receives a second client call 301 in which the micro-service identifier also relates to the second micro-service 305*b*, the switch identifier refers to switch_1 307*a* and the configuration parameters are the number of the port, 21, and a Boolean parameter, enable=false. Thus, the second client call 301 is to deactivate port 21 of switch_1 307*a*. The virtual device 304 also receives a third client call 302 in which the micro-service identifier relates to the third micro-service 305*c* storing a generic configuration primitive to add VLANs to a port, the switch identifier refers to switch_3 307*c* and the configuration parameters are the number of the port, 22, and the numbers of the VLANs assigned to the port, 456 and 789. Thus, the third client call 302 is to add VLANs 456 and 789 to port 22 of the switch_3 307*c*. The virtual device 304 also receives a fourth client call 303 in which the micro-service identifier also relates to the third micro-service 305*c* storing a generic configuration primitive to add a VLAN to a port, the switch identifier refers to switch_1 307*a* and the configuration parameters are the number of the port, 21, and the numbers of the VLANs assigned to the port, 456 and 789. Thus, the fourth client call 302 is to add VLANs 456 and 789 to port 21 of switch_1 307*a*.

It should be understood that the example depicted in FIG. 3 may include additional components and that some of the components described herein may be removed or modified without departing from a scope of the example. It should be also understood that this example does not intend to be limiting.

Figure 4:
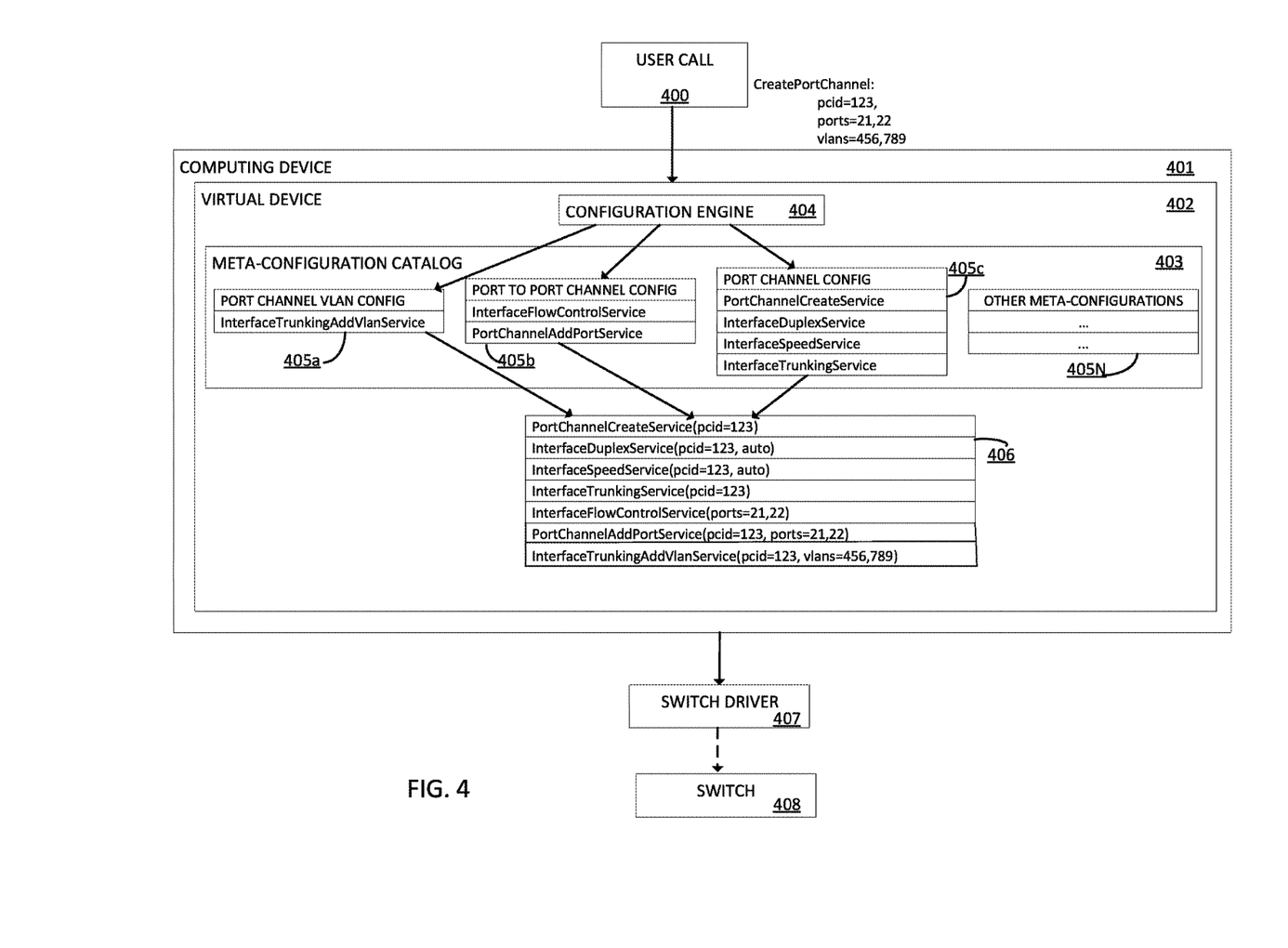
FIG. 4 is a block diagram of an example computing device for configuring switches in a computer network using micro-services in a virtual device, including a meta-catalog and a configuration engine.

FIG. 4 is a block diagram of an example computing device for configuring switches in a computer network using micro-services in a virtual device, including a meta-catalog and a configuration engine.

In such example, the computing device 401 comprises a virtual device 402 that in turn comprises a configuration engine 404 and a meta-configuration catalog 403. The meta-configuration catalog 403 is a list of meta-configurations 405*a*-405N, in which N is an integer value greater than one. In turn, meta-configurations 405*a*-405N are groups of micro-services related with a common area of configuration of the switches. Therefore, said meta-configurations 405*a*-405N are larger configurations covering an area of configuration (e.g., port channel configuration, port channel VLAN configuration, etc.) of the switches, described as discrete lists of any number of configuration micro-services. These meta-configurations can be executed on any switch supported by the switch drivers in the micro-service framework. The configuration engine 404 performs the meta-configurations 405*a*-405N covering configuration areas of the switches by selecting and ordering appropriate micro-services previously stored in the virtual device 402. In this example, the configuration engine 404 creates a first meta-configuration 405*a* covering the "Port Channel VLAN configuration area" that includes one single micro-service "InterfaceTrunkingAddVlanService" to add a VLAN to a port's trunking configuration in the switch. The configuration engine 404 also performs a second meta-configuration 405*b* covering the "Port To Port Channel configuration area" that includes two micro-services, a first micro-service "InterfaceFlowControlService" to configure an interface's flow control parameters, and a second micro-service "PortChannelAddPortService" to add a port to a port-channel. The configuration engine 404 also performs a third meta-configuration 405*c* covering the "Port Channel configuration area" that includes 4 micro-services, a first micro-service "PortChannelCreateService" to create a new port channel in the switch, a second micro-service "InterfaceDuplexService" to configure the duplex mode of a port-channel, a third micro-service "InterfaceSpeedService" to modify the transmission speed of a port-channel of the switch and a fourth micro-service "InterfaceTrunkingService" to activate trunking mode of a port-channel on the switch. The meta-configuration catalog 403 may further store other meta-configurations 405N performed by the configuration engine 404.

In such examples, the user calls may include meta-configuration identifiers to apply only one meta-configuration covering one single configuration area or to apply two or more combined meta-configurations covering several configuration areas to the respective switches. The meta-configurations may be grouped, by the configuration engine

404, creating complex configurations in response to a request from a user by selecting and ordering appropriate meta-configurations 405a-405N from the meta-configurations catalog 403. The meta-configurations identifiers and the order in which they are executed are provided by the users within the user call. These complex configurations may be applied to one or several switches depending on the switch identifiers provided in the user call. The user calls may also comprise the corresponding configuration parameters.

In such example, the configuration engine 404 receives a user call 400 that includes the following configuration parameters: "createPortChannel", "pcid=123", "ports=21, 22" and "vlans=456,789". The configuration parameters may be in the form of strings, numbers and Booleans. The configuration engine 404 receives this user call 400 from the user and may interpret the configuration parameters that are passed in. In this example, via the configuration parameters, the user is requesting that 1) a port-channel be created, 2) with an id of 123, 3) with the ports 21 and 21 as members of this port-channel and 4) with VLANs 456 and 789 applied to this port channel. The configuration engine 404 may interpret this user call 400 via these configuration parameters and may select meta-configurations 405a-405N from the meta-configuration catalog 403 to create a complex configuration formed by an ordered list of micro-service calls to be applied to the respective switch. The user call 400 may also include a switch identifier to identify switch 408 on which the configuration change is to be performed. In some other examples, the user call 400 may comprise meta-configuration identifiers making reference to those meta-configurations storing the micro-services to be applied to the switch.

In such example, the configuration engine 404 selects meta-configurations 405a,405b,405c from the meta-configuration catalog 403. On selecting these meta-configurations 405a,405b,405c the configuration parameters are passed into the corresponding micro-services contained therein. For example, the configuration parameter "pcid=123" gets passed into the meta-configurations 405a-405N that deal with port-channels which then pass this parameter into the micro-services that deal with port-channels. Thus, a complex configuration 406 is created by grouping meta-configurations 405a,405b,405c such that the following micro-services are combined and ordered by the configuration engine 404 with their corresponding configuration parameters: "PortChannelCreateService(pcid=123)" micro-service to create a port-channel with an id of 123, "InterfaceDuplexService(pcid=123, auto)" micro-service to set the duplex mode of the port-channel 123 in an automatic mode, "InterfaceSpeedService(pcid=123, auto)" micro-service to set the transmission speed of the port-channel 123 in an automatic mode, "InterfaceTrunkingService(pcid=123)" micro-service to activate trunking mode of the port-channel 123, "InterfaceFlowControlService(ports=21,22)" micro-service to configure the interface's flow control parameters of ports 21 and 22, "PortChannelAddPortService(pcid=123, ports=21,22)" micro-service to add ports 21 and 22 to the port-channel 123, and "InterfaceTrunkingAddVlanService (pcid=123, vlans=456,789)" micro-service to add VLANs 456 and 789 to the trunking configuration of port-channel 123. This complex configuration 406 may further include other micro-services related with the port-channels of the switches.

In such examples, the configuration engine 404 may implement, in order, the full list of micro-services described in each meta-configuration 405a-405N and in each complex configuration 406. Therefore, the micro-services of the complex configuration 406 call their respective configuration primitives on the respective switch driver 407 based on the respective configuration parameters.

Examples described herein create a single catalog of generic meta-configurations (groupings of micro-services) which can be combined and recombined while implementing them specifically in specific switch drivers of different switch models and types. These meta-configurations are a catalog of higher-level configuration primitives which each define what can be configured on a switch. By selecting and ordering pre-defined micro-services in groups to create meta-configurations, complex configurations are easily designed and executed. The meta-configurations are defined only once regardless of the number of switches being supported. These examples provide several advantages: new configurations are achieved by recombining existing meta-configurations in new ways, they are created once for the benefit of all switches being supported, and this single place of configuration (the virtual device) definition makes for ease of maintenance as it only occurs in one place.

In some examples, the virtual device 402 could be a library included in the software containing the configuration engine 404. In some other examples, the virtual device 402 and the configuration engine 404 could be hosted separately, with the virtual device 402 being exposed as a separately-hosted service that the configuration engine 404 communicates with.

As used herein, the configuration engine 404 may comprise any combination of hardware and programming to implement the functionalities of the configuration engine described herein. In examples described herein, such combinations of hardware and programming may be implemented in a number of different ways. For example, the programming for engines may be processor executable instructions stored on at least one non-transitory machine-readable storage medium and the hardware for engines may include at least one processor to execute those instructions. In some examples, the at least one machine-readable storage medium may store instructions that, when executed by the at least one processing resource, at least partially implement the engine(s). In examples described herein, multiple engines may be collectively implemented by a combination of hardware and programming, as described above. In some examples, the functionalities of the cloud provider engine may be at least partially implemented in the form of electronic circuitry.

Figure 5:
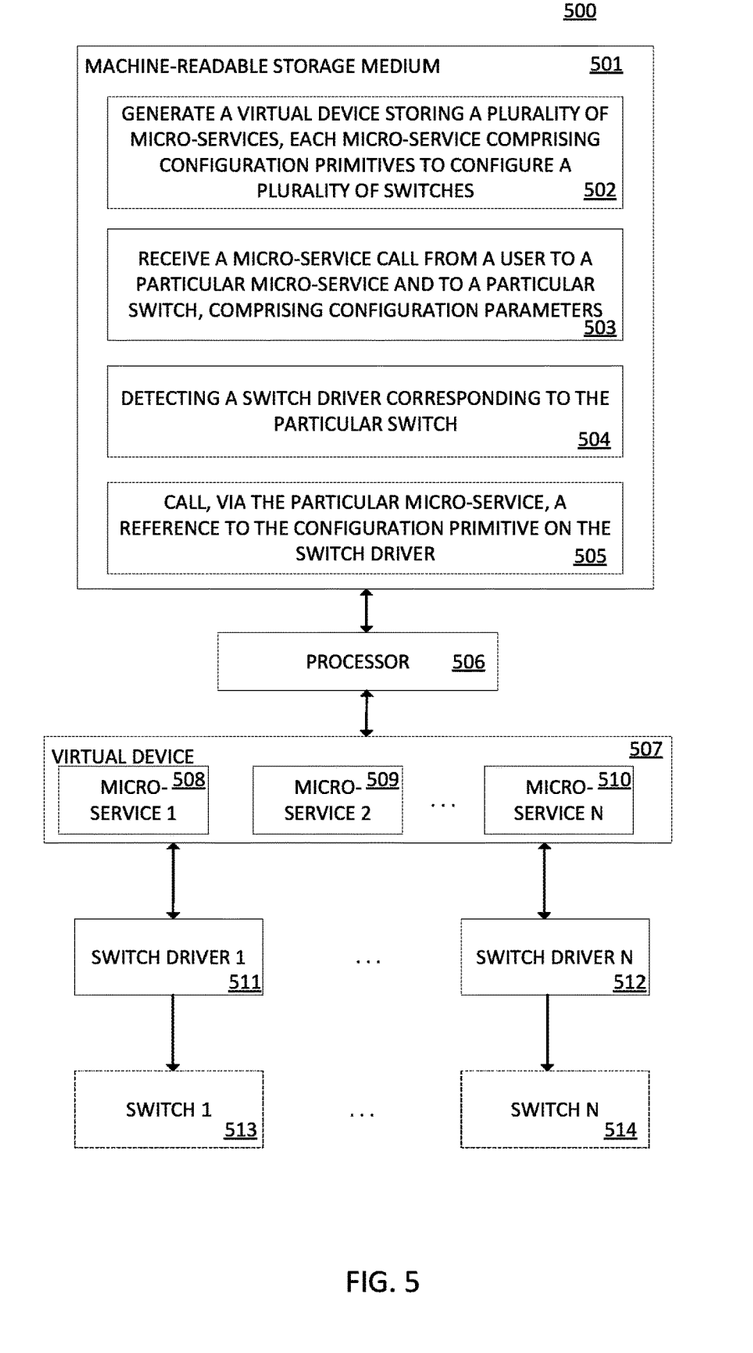
FIG. 5 is block diagram of an example system for configuring switches using micro-services in a virtual device, including a machine-readable storage medium that stores instructions to be executed by a processor.

FIG. 5 is block diagram of an example system that is to configure switches using micro-services stored in a virtual device, in which a machine-readable storage medium stores instructions to be executed by a processor. It should be understood that the system depicted in FIG. 5 may include additional components and that some of the components described herein may be removed or modified without departing from a scope of the system 500. It should be also understood that this example does not intend to be limiting.

The system 500 is depicted as including a plurality of switches 513-514, a plurality of corresponding switch drivers 511-512 associated to the respective switches 513-514, a virtual device 507 storing a plurality of micro-services 508-510, wherein each micro-service stores at least one reference to a configuration primitive to configure a configuration characteristic of a plurality of the switches 513-514, a machine-readable storage medium 501 and a processor 506. The processor 506 may fetch, decode, and execute instructions, such as the instructions 502-505 stored on the machine-readable storage medium 501.

The processor 506 executes the instructions 502-505 to generate 502 a virtual device 507 in a computing device storing a plurality of micro-services 508-510, wherein each micro-service 508-510 stores a configuration primitive and a reference to the configuration primitive. The virtual device 507 receives 503 a micro-service call from a user, said micro-service call comprising configuration parameters. The micro-service call is to a particular micro-service from the plurality of micro-services 508-510 and to a particular switch from the plurality of switches 513-514. The processor 506 executes instructions to detect 504 a switch driver 511-512 corresponding to the particular switch 513-514. The virtual device 507 looks up the switch driver 511-512 matching the switch device type being configured and then calls the appropriate configuration primitive on the switch driver 511-512 and delegates the configuration parameters and the configuration primitive work to the switch driver 511-512. Each switch driver 511-512 comprises configuration commands to implement the respective configuration primitive of the respective micro-service 508-510.

The processor 506 also executes instructions to call 505, via the invoked micro-service 508-510 the stored reference to a configuration primitive, of which there is at least one, on the respective switch driver 511-512 based on the configuration parameters received with the call. The switch driver 511-512 associated to the requested switch 513-514, executes the precise set of configuration commands for successful configuration of the switch 513-514.

The machine-readable storage medium 501 may be any electronic, magnetic, optical, or other physical storage device that contains or stores executable instructions. Thus, the machine-readable storage medium 501 may be, for example, Random Access Memory (RAM), a storage device, an optical disc, and the like. The machine-readable storage medium 501 may be a non-transitory machine-readable storage medium, where the term "non-transitory" does not encompass transitory propagating signals.

As used herein, the "processor" may be any type of electronic circuitry within a computing device that carries out the instructions of a computer program by performing basic arithmetic, logical, control and input/output (I/O) operations specified by the instructions, wherein these instruction may be embodied in code. The "processor" may include, for example, a central processing unit (CPU), a semiconductor-based microprocessor, an application specific integrated circuit (ASIC), a graphical processing unit (GPU), or other hardware device suitable for retrieval and execution of instructions stored in a machine-readable storage medium.

The solution herein described achieves many technical effects, including the possibility of grouping micro-services to create larger meta-configurations that can be run against different switch types and models instead of creating a switch-specific script containing each of the execution commands of each sub configuration. Other technical effects include the possibility of making changes in configurations (adding or changing the sub configurations) at the generic level, that is, choosing different micro-services or reordering them, making it easy and in one place instead of modifying all switch-specific scripts and the possibility of creating new micro-services by creating new combinations and reordering existing micro-services instead of implement a new configuration script from scratch (and for each vendor). Further technical effects include the possibility of providing support for a new automated configuration by creating new micro-services which are implemented just once and shared by all switches in the computer network (with specifics implemented in the driver for each switch type and model) instead of implementing the new configuration from scratch and re-implement it entirely for each switch type and model.

Other technical effects of the examples herein described include extending the network device configuration by extending the types and models of the supported switches by programming their respective drivers with the corresponding configuration commands to implement the existing micro-services or by extending the kind of configurations that can be applied to the network devices by composing different combinations of micro-services into more complex configuration requests.

What is claimed is:

1. A method comprising:
   exposing, in a virtual device, a plurality of stored micro-services, wherein each of the micro-services comprises at least one generic configuration primitive to configure a plurality of switches, and wherein the at least one generic configuration primitive comprises the smallest granular configuration element to modify a specific configuration of the plurality of switches;
   receiving, in the virtual device, a call comprising configuration parameters, wherein the call is to a particular micro-service from the plurality of micro-services stored in the virtual device and to a particular switch from a plurality of switches;
   detecting, by the virtual device, a switch driver corresponding to the particular switch, wherein each switch driver comprises configuration commands to implement the respective at least one configuration primitive of the respective micro-service; and
   calling, via the particular micro-service, the respective at least one configuration primitive on the respective switch driver based on the respective configuration parameters.

2. The method of claim 1, wherein calling the respective at least one configuration primitive on the respective switch driver comprises executing, by the switch driver, the configuration commands to implement the configuration primitive based on the received configuration parameters.

3. The method of claim 1, wherein the generic configuration primitive configures a particular configuration characteristic of at least one of the plurality of switches.

4. The method of claim 1, wherein the call comprises a micro-service identifier, a switch identifier and the configuration parameters.

5. The method of claim 1, wherein the at least one configuration primitive comprises a plurality of configuration primitives to configure a plurality of configuration characteristics of at least one of the plurality of switches.

6. The method of claim 1, wherein calling the respective at least one configuration primitive on the respective switch driver comprises:
   connecting the virtual device to the switch driver; and
   with the virtual device, causing the switch to activate a configuration mode and to execute the configuration commands to implement the configuration primitive of the micro-service.

7. The method of claim 1, comprising creating, by a configuration engine, meta-configurations by grouping micro-services that cover a common area of configuration of the plurality of switches.

8. The method of claim 7, comprising creating, by a configuration engine, the meta-configurations by selecting and ordering at least two micro-services that cover a common area of configuration of the plurality of switches.

9. The method of claim 7, comprising creating, by a configuration engine, complex configurations by selecting and ordering at least two meta-configurations covering at least two areas of configuration of the plurality of switches.

10. The method of claim 8, comprising exposing, in the virtual device, the meta-configurations by exposing the at least two micro-services forming each one of the meta-configurations to the switch driver based on the configuration parameters.

11. The method of claim 9, comprising exposing, in the virtual device, the complex configurations by exposing the micro-services of the meta-configurations forming each one of the complex configurations to the switch driver based on the configuration parameters.

12. The method of claim 1, comprising connecting the virtual device with the switches via a protocol selected from a group including a Secure Shell (SSH) protocol, a telnet protocol and a Hypertext Transfer Protocol (HTTP).

13. The method of claim 1, wherein each one of the plurality of micro-services stores a reference to the configuration primitive that the micro-service stores.

14. A computing device comprising:
a processor;
a memory comprising instructions executable by a processor to:
implement a virtual device including a plurality of micro-services, wherein each of the micro-services comprises a generic configuration primitive to configure a particular configuration characteristic of at least one of a plurality of switches in a configuration area of port port channel, or Virtual Local Area Network (VLAN);
receive, by the virtual device, a micro-service call comprising configuration parameters, the micro-service call being for a particular micro-service from the plurality of micro-services and for a particular switch from the plurality of switches;
detect, by the virtual device, a switch driver corresponding to the particular switch, wherein each switch driver comprises configuration commands, and to implement the generic configuration primitives of the respective micro-service;
call, by the particular micro-service, the generic configuration primitives to the respective switch driver; and
executing, by the switch driver, the configuration commands to implement the configuration primitives based on the respective configuration parameters.

15. The computing device of claim 14, wherein the virtual device, when implemented, includes a configuration engine to create meta-configurations by grouping micro-services that cover a common area of configuration.

16. The computing device of claim 15, wherein the configuration engine is to create complex configurations by selecting and ordering at least two micro-services from at least one meta-configuration.

17. The computing device of claim 14, wherein the configuration primitive comprises a plurality of configuration primitives to configure a plurality of configuration characteristics of the plurality of switches.

18. The computing device of claim 14, comprising a protocol selected from a group including a Secure Shell (SSH) protocol, a telnet protocol and a Hypertext Transfer Protocol (HTTP) to communicate the virtual device with the switches.

19. A non-transitory machine-readable storage medium comprising instructions executable by a processor to:
generate a virtual device in a computing device, the virtual device comprising a plurality of micro-services, wherein each of the micro-services comprises at least one generic configuration primitive to configure a port in a plurality of switches;
receive a micro-service call comprising a micro-service identifier, a switch identifier and configuration parameters, wherein the micro-service call is to a particular micro-service from the plurality of micro-services and to a particular switch from the plurality of switches;
detect a switch driver corresponding to the particular switch, wherein each switch driver comprises configuration commands to implement the configuration primitives of the micro-services; and
cause the particular micro-service to call a reference to the respective at least one configuration primitive on the switch driver based on the configuration parameters.

20. The non-transitory machine-readable storage medium of claim 19, wherein the instructions to cause the particular micro-service to call a reference to the respective at least one configuration primitive on the switch driver, comprise instructions to:
connect the virtual device to the switch driver; and,
with the virtual device, cause the switch to activate a configuration mode and to execute the configuration commands to implement the configuration primitive of the micro-service.

* * * * *